Figure 1:
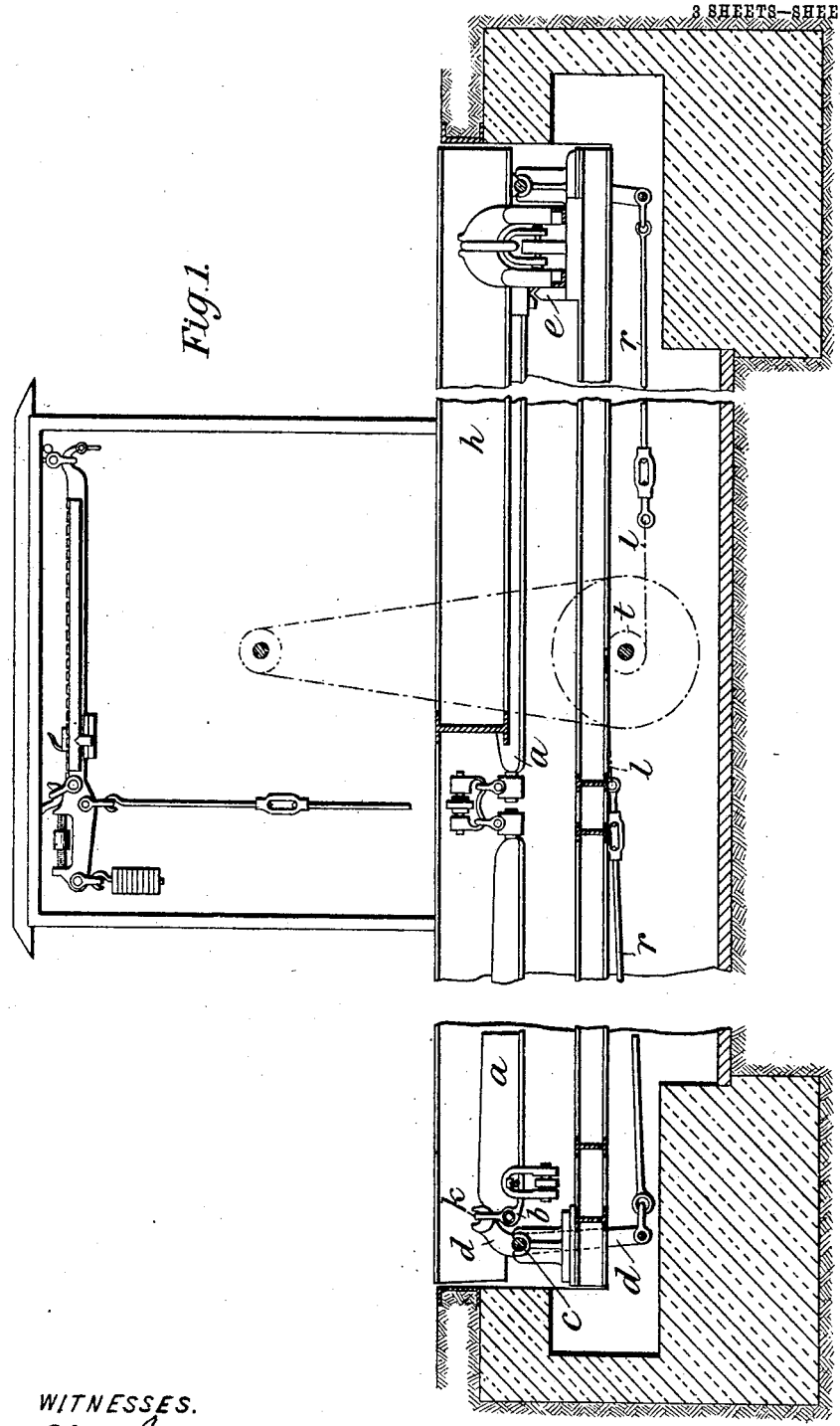

No. 839,946. PATENTED JAN. 1, 1907.
E. VON MIKLÓS.
RAILWAY WEIGH BRIDGE.
APPLICATION FILED MAY 3, 1902.

3 SHEETS—SHEET 1.

WITNESSES.
Albert Jones
Herbert C. Bolwell

INVENTOR.
Edmund von Miklos
By his Attorneys.
Wheatley Mackenzie

THE NORRIS PETERS CO., WASHINGTON, D. C.

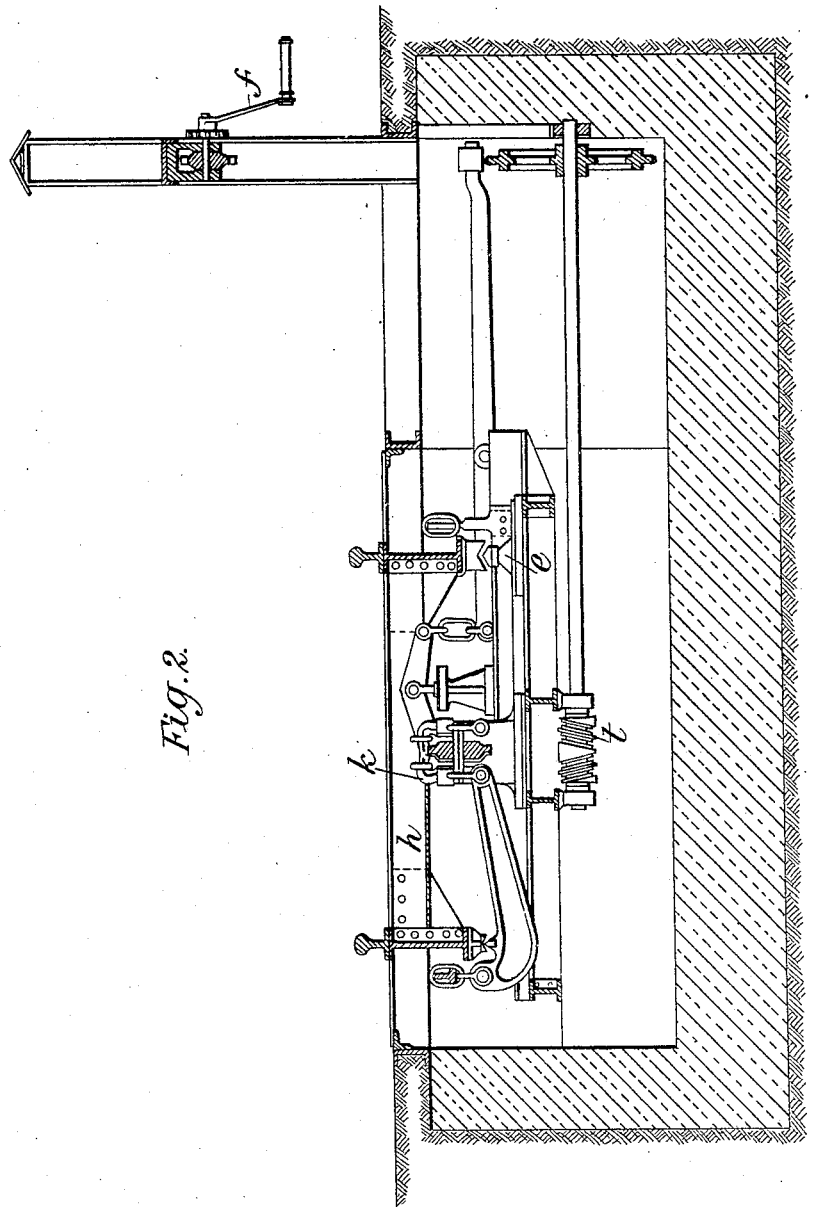

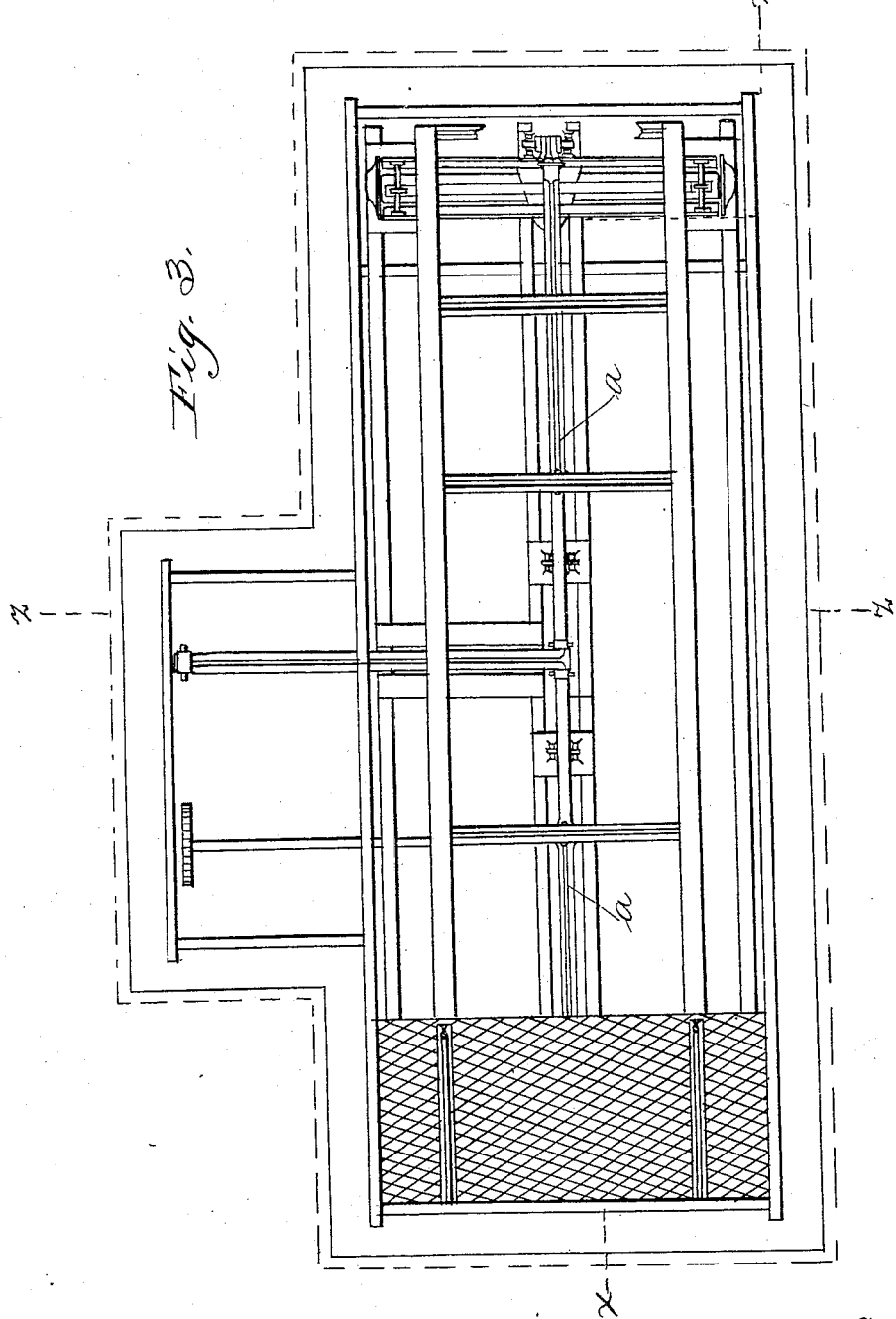

UNITED STATES PATENT OFFICE.

EDMUND VON MIKLÓS, OF BUDAPEST, AUSTRIA-HUNGARY.

RAILWAY WEIGH-BRIDGE.

No. 839,946.  Specification of Letters Patent.  Patented Jan. 1, 1907.

Application filed May 3, 1902. Serial No. 105,836.

*To all whom it may concern:*

Be it known that I, EDMUND VON MIKLÓS, a subject of the King of Austria-Hungary, whose post-office address is 29 Delibáb utca, Budapest, Austria-Hungary, have invented certain new and useful Improvements in or Connected with Railway Weigh-Bridges; and I do hereby declare the following to be a full, clear, and exact description of the invention, such as will enable others skilled in the art to which it appertains to make and use the same.

This invention for improvements in or connected with railway weigh-bridges relates to railway weigh-bridges preferably of the Fairbanks kind, and has for its object to provide a device for relieving the strain on the actual weighing mechanism and putting it out of engagement. By means of this device the weighing apparatus is so adjusted that the shocks and jolts to which the weigh-bridge is exposed are prevented from affecting the weighing parts of the apparatus. Hitherto Fairbanks weigh-bridges have not been provided with such a device. As, however, the internal mechanism of such weighing apparatus is exposed to considerable shaking and jolting when locomotives are passing onto or over it, the weighing mechanism according to this invention is so altered that after the weigh-bridge has been used it is at once suitably supported and put out of kinematic connection with the other parts of the apparatus. In this manner it is obvious that the jolting and shaking to which the table is exposed are prevented from affecting the weighing mechanism, whereby the lever-arms of the weighing mechanism, and especially the knife-edges of the same, are not uselessly strained, and these parts are relieved from unnecessary wear.

In comparison with known apparatus of the kind the essential feature of the new contrivance described hereinafter is that after the parts which relieve the strain have been actuated—that is, after the unwinding of one link of the chain—the weighing apparatus is completely and instantaneously put directly out of action. In this manner imperfect action and indication of the weighing mechanism in consequence of faulty adjustment or working of the strain-relieving device is entirely prevented. A weigh-bridge of the kind furnished with such a strain-relieving apparatus and altered suitably thereto and in which the table can be lengthened at will by the engaging of gear-levers is illustrated by way of example in the accompanying drawings in connection with short weighing apparatus.

Figure 1 is a longitudinal sectional view on line $x$ $x$ of Fig. 3, parts being shown in elevation. Fig. 2 is a sectional view on line $z$ $z$ of Fig. 3, parts being in elevation. Fig. 3 is a plan view of a scales constructed in accordance with this invention.

In order to constitute the strain-relieving apparatus according to the present invention, the weigh-bridge is so altered that the fulcrum $b$ of the lever $a$ is not fixed, as has been the case hitherto in Fairbanks weighing apparatus, but is made movable in order to raise and lower the table somewhat, the fulcrum $b$, with the lever $a$, being suspended by means of the bent piece $k$ to one arm of a suitably-formed two-arm lever $d$. It can be easily seen that by moving the lower arm of the lever outward and inward the weigh-bridge can be moved in the requisite manner to the extent of a few millimeters. In the former case the fulcrum $b$ is lowered, and therewith also the platform $h$, which when in the lowermost position lies on the points $e$ at the four corners of the weighing apparatus and is supported by them independently of the other parts. When the lower arm of each lever $d$ is moved inward, the levers of the weighing apparatus are raised and lift the table from the points, whereby the table is again brought into position for use.

The weighing devices in their simplest form when so constructed as to be relieved of strain consist of four transverse levers which are situated vertically in relation to the longitudinal axis and form the principal bearing-levers of the weighing device and of two multiplication middle levers which are connected with the transmission-lever by means of one or two balance-levers having arms of equal length and with the weighing-beam by means of a connecting-rod.

In order that it may be possible to effect the inward and outward movement of the lever $d$ from the weigh-office, the lower end of this lever is connected, by means of a rod $r$ and a chain $l$, with a chain-drum $t$, which can be so rotated through the medium of a chain-gear and crank $f$ that the platform is lowered by the slacking of the chain, but raised when the chain is tightened.

What I claim, and desire to secure by Letters Patent, is—

1. In a device of the character described, means for entirely and instantaneously putting the balance out of action, the same comprising two-armed levers each having a bent piece, levers each having its fulcrum movably connected with one of said bent pieces, a platform, sustaining-points at the corners of the platform, and means for operating the said two-armed levers whereby the platform is lifted from said points, substantially as described.

2. In a device of the character described, the combination with the weighing devices comprising the levers $a$, two-armed levers each having a bent portion, the first-mentioned levers each having its fulcrum movably connected with one of said bent portions, a platform, and means for operating the said two-armed levers to effect the raising and lowering of the platform comprising a chain-drum, chains and rods connecting the drum with one arm of the said two-armed levers in the manner described whereby the platform is lowered by the slackening of the chains and raised when the latter are tightened, and means for turning the drum.

In testimony whereof I have affixed my signature in presence of two witnesses.

EDMUND VON MIKLÓS.

Witnesses:
FRANK DYER CHESTER,
T. LOGNORDIO.